United States Patent
Chiu (10) Patent No.: US 9,727,215 B2
(45) Date of Patent: Aug. 8, 2017

(54) METHOD FOR PERFORMING MULTIMEDIA MANAGEMENT UTILIZING TAGS, AND ASSOCIATED APPARATUS AND ASSOCIATED COMPUTER PROGRAM PRODUCT

(71) Applicant: HTC Corporation, Taoyuan County (TW)

(72) Inventor: Kai-Feng Chiu, Taoyuan County (TW)

(73) Assignee: HTC Corporation, Taoyuan (TW)

(*) Notice: Subject to any disclaimer, the term of this patent is extended or adjusted under 35 U.S.C. 154(b) by 454 days.

(21) Appl. No.: 14/076,287

(22) Filed: Nov. 11, 2013

(65) Prior Publication Data

US 2015/0135068 A1 May 14, 2015

(51) Int. Cl.
*G06F 3/0484* (2013.01)
*G06F 3/0488* (2013.01)

(52) U.S. Cl.
CPC .......... *G06F 3/0484* (2013.01); *G06F 3/0488* (2013.01); *G06F 3/04847* (2013.01)

(58) Field of Classification Search
CPC .................................................. G06F 3/0484
USPC ...................................................... 715/716
See application file for complete search history.

(56) References Cited

U.S. PATENT DOCUMENTS

| 6,757,906 | B1 | 6/2004 | Look |
| 2006/0013555 | A1 | 1/2006 | Poslinski |
| 2006/0020966 | A1 | 1/2006 | Poslinski |
| 2008/0180391 | A1* | 7/2008 | Auciello ............... G06F 3/1423 345/156 |
| 2009/0094520 | A1* | 4/2009 | Kulas ................ G06F 17/30056 715/723 |
| 2009/0187825 | A1 | 7/2009 | Sandquist |
| 2012/0047119 | A1* | 2/2012 | Kandekar ......... G06F 17/30849 707/705 |
| 2012/0166950 | A1 | 6/2012 | Frumar |
| 2014/0168097 | A1* | 6/2014 | Oh ....................... G11B 27/005 345/173 |

(Continued)

FOREIGN PATENT DOCUMENTS

| CN | 1984299 A | 6/2007 |
| CN | 101739450 A | 6/2010 |
| CN | 101957752 A | 1/2011 |

(Continued)

OTHER PUBLICATIONS

Office action mailed on Apr. 12, 2016 for the Taiwan application No. 103107255, filed Mar. 4, 2014, p. 1-3.

(Continued)

*Primary Examiner* — Andrea Leggett
(74) *Attorney, Agent, or Firm* — Winston Hsu (57) ABSTRACT

A method and apparatus for performing multimedia management utilizing tags and an associated computer program product are provided, where the method is applied to an electronic device. The method includes the steps of: providing a user interface to allow a user to add at least one tag corresponding to at least one timestamp of a multimedia file onto a progress bar of the user interface; and when it is detected that a specific tag added onto the progress bar of the user interface is selected for tag-based playback, playing the multimedia file, starting from a specific timestamp indicated by tag information of the specific tag.

18 Claims, 9 Drawing Sheets

(56) References Cited

U.S. PATENT DOCUMENTS

2015/0113058 A1* 4/2015 Zhang .................. H04L 65/403
709/204

FOREIGN PATENT DOCUMENTS

| CN | 103024576 A | 4/2013 |
| CN | 103325396 A | 9/2013 |

OTHER PUBLICATIONS

Office action dated May 18, 2017 for the China application No. 201410239806.6, filing date May 30, 2014, p. 1-11.

* cited by examiner

METHOD FOR PERFORMING MULTIMEDIA MANAGEMENT UTILIZING TAGS, AND ASSOCIATED APPARATUS AND ASSOCIATED COMPUTER PROGRAM PRODUCT

BACKGROUND OF THE INVENTION

1. Field of the Invention

The present invention relates to video playback of a portable electronic device, and more particularly, to a method for performing multimedia management utilizing tags, and to an associated apparatus and an associated computer program product.

2. Description of the Prior Art

A conventional portable electronic device implemented according to the related art, such as a multifunctional mobile phone equipped with personal digital assistant (PDA) functionalities or a PDA equipped with mobile phone functionalities, may have become an important part of everyday life since it is very helpful. In a situation where the user of the conventional portable electronic device tries to share a video clip with his/her friends, some problems may occur. For example, the user may use the conventional portable electronic device to send an electronic mail (email) to his/her friends in order to share the video clip, and it may take a long time for his/her friends to view the whole of the video clip before they really know each of the interesting things in the video clip. In another example, the user may use the conventional portable electronic device to upload the video clip onto a server and to send the location of the video clip on the server to his/her friends in order to share the video clip, and it may still take a long time for his/her friends to view the whole of the video clip before they really know each of the interesting things in the video clip. Thus, a novel method is required for enhancing a video sharing service in an electronic device.

SUMMARY OF THE INVENTION

It is therefore an objective of the claimed invention to provide a method for performing multimedia management utilizing tags, and to provide an associated apparatus and an associated computer program product, in order to solve the above-mentioned problems.

It is another objective of the claimed invention to provide a method for performing multimedia management utilizing tags, and to provide an associated apparatus and an associated computer program product, in order to enhance a video sharing service in an electronic device.

According to at least one preferred embodiment, a method for performing multimedia management utilizing tags is provided, where the method is applied to an electronic device. The method comprises the steps of: providing a user interface to allow a user to add at least one tag corresponding to at least one timestamp of a multimedia file onto a progress bar of the user interface; and when it is detected that a specific tag added onto the progress bar of the user interface is selected for tag-based playback, playing the multimedia file, starting from a specific timestamp indicated by tag information of the specific tag.

According to at least one preferred embodiment, an apparatus for performing multimedia management utilizing tags is also provided, where the apparatus comprises at least one portion of an electronic device. The apparatus comprises a storage unit comprising a tag database, and further comprises a processing circuit coupled to the storage unit. The storage unit is arranged to store information for the electronic device, and the tag database is utilized for storing tag information of tags. In addition, the processing circuit is arranged to control operations of the electronic device, and further arranged to provide a user interface to allow a user to add at least one tag corresponding to at least one timestamp of a multimedia file onto a progress bar of the user interface. Additionally, when it is detected that a specific tag added onto the progress bar of the user interface is selected for tag-based playback, the processing circuit plays the multimedia file, starting from a specific timestamp indicated by tag information of the specific tag.

According to at least one preferred embodiment, a computer program product is also provided, where the computer program product has program instructions for instructing a processor of an electronic device to perform a method comprising the steps of: providing a user interface to allow a user to add at least one tag corresponding to at least one timestamp of a multimedia file onto a progress bar of the user interface; and when it is detected that a specific tag added onto the progress bar of the user interface is selected for tag-based playback, playing the multimedia file, starting from a specific timestamp indicated by tag information of the specific tag.

It is an advantage of the present invention that the aforementioned method, the aforementioned apparatus, and the aforementioned computer program product can save the time of the user and the time of his/her friends, where the user does not need to explain (e.g. with one or more text paragraphs) since the tags indicate the hints for viewing, and his/her friends do not need to spend a long time to view the whole of the video clip before they really know each of the interesting things in the video clip. In addition, the aforementioned method, the aforementioned apparatus, and the aforementioned computer program product can enhance a video sharing service in an electronic device. Additionally, the user may input a tag text of a specific tag into the electronic device, for being utilized as a hint for the user and his/her friends, so the specific tag can be easily and immediately selected from a plurality of tags previously added on the progress bar of the user interface, bring them great viewing experience.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
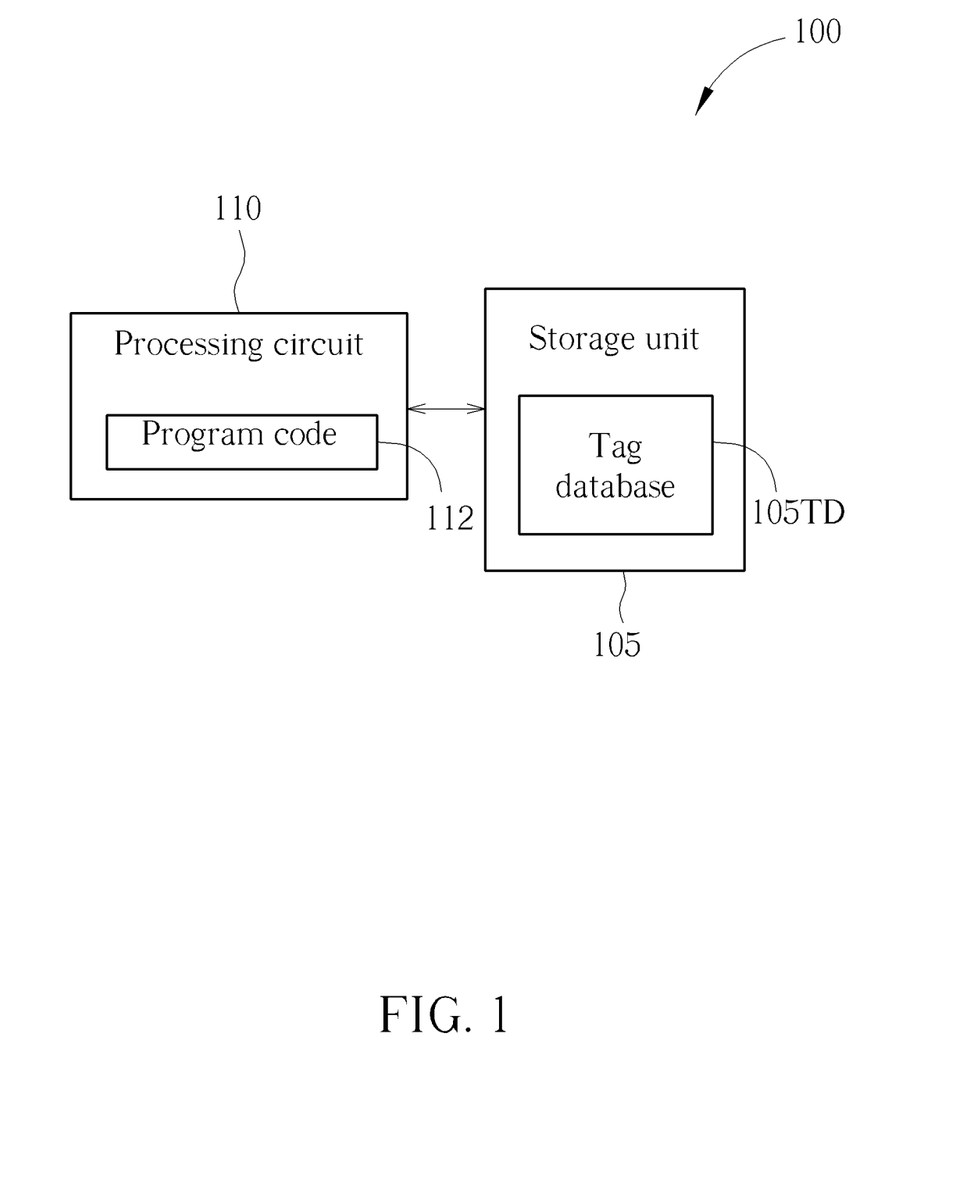
FIG. 1 is a diagram of an apparatus for performing multimedia management utilizing tags according to an example.

Please refer to FIG. 1, which illustrates a diagram of an apparatus 100 for performing multimedia management utilizing tags according to an example, where the apparatus 100 may comprise at least one portion (e.g. a portion or all) of an electronic device. For example, the apparatus 100 may comprise a portion of the electronic device mentioned above, and more particularly, can be a main control circuit such as an integrated circuit (IC) within the electronic device. In another example, the apparatus 100 can be the whole of the electronic device mentioned above. Examples of the electronic device may include, but not limited to, a mobile phone (e.g. a multifunctional mobile phone), a mobile computer (e.g. tablet computer), a personal digital assistant (PDA), and a personal computer such as a laptop computer or desktop computer.

As shown in FIG. 1, the apparatus 100 comprises a storage unit 105 and a processing circuit 110, where the processing circuit 110 can be coupled to the storage unit 105, and more particularly, can be electrically connected to the storage unit 105. According to this example, the storage unit 105 is arranged to store information for the electronic device, and the processing circuit 110 is arranged to control operations of the electronic device. Please note that the processing circuit 110 can be selectively implemented with the mixed scheme utilizing software (or firmware) module running on hardware circuit(s), or implemented with the pure hardware scheme. For example, the processing circuit 110 may comprise a processor and associated hardware circuits implemented by using at least one printed circuit board (PCB) on which the processor can be installed, and the storage unit 105 may comprise at least one memory such as at least one random access memory (RAM) and/or at least one non-volatile memory (e.g. an electrically erasable programmable read only memory (EEPROM) or a Flash memory), where the program code 112 may be stored in the storage unit 105 in advance and retrieved by the processing circuit 110, for running on the processing circuit 110 as illustrated in FIG. 1. This is for illustrative purposes only, and is not meant to be a limitation. In another example, the processing circuit 110 may be implemented as pure hardware circuit(s), where the program code 112 is imbedded therein.

According to this example, the processing circuit 110 (more particularly, the processing circuit 110 executing the program code 112 such as an application, an operating system or a driver) is capable of performing multimedia management utilizing tags. For example, the storage unit 105 may comprises a tag database 105TD, and the tag database 105TD can be utilized for storing tag information of the tags, such as a plurality of timestamps of a multimedia file that are associated to the tags and a plurality of tag texts (e.g. a plurality of tag strings) of the tags, where the user may input or edit the tag texts of these tags for further use. This is for illustrative purposes only, and is not meant to be a limitation. In another example, the processing circuit 110 (more particularly, the processing circuit 110 executing the program code 112 such as an application, an operating system or a driver) is capable of attaching the aforementioned tag information (e.g. the timestamps associated to the tags and the tag texts (or tag strings) of the tags) to the multimedia file (e.g. a video clip such as that mentioned above). In a situation where the user shares the multimedia file with his/her friends and their electronic devices such as their mobile phones are equipped with the same functionalities as that of the electronic device mentioned above (e.g. they may own the same type of mobile phones, each of which is implemented according to one or more embodiments of the present invention), these electronic devices may play the multimedia file, starting from a time stamp corresponding to any of the tags, with aid of the aforementioned tag information attached to the multimedia file. For example, these electronic devices may directly utilize the aforementioned tag information attached to the multimedia file. In another example, these electronic devices may store the aforementioned tag information attached to the multimedia file into their tag databases {105TD} in advance, respectively, and then utilize the aforementioned tag information in their tag databases { 105TD}, respectively. As a result, the related art problems can be prevented, and the friends of the user can save their time.

Figure 2:
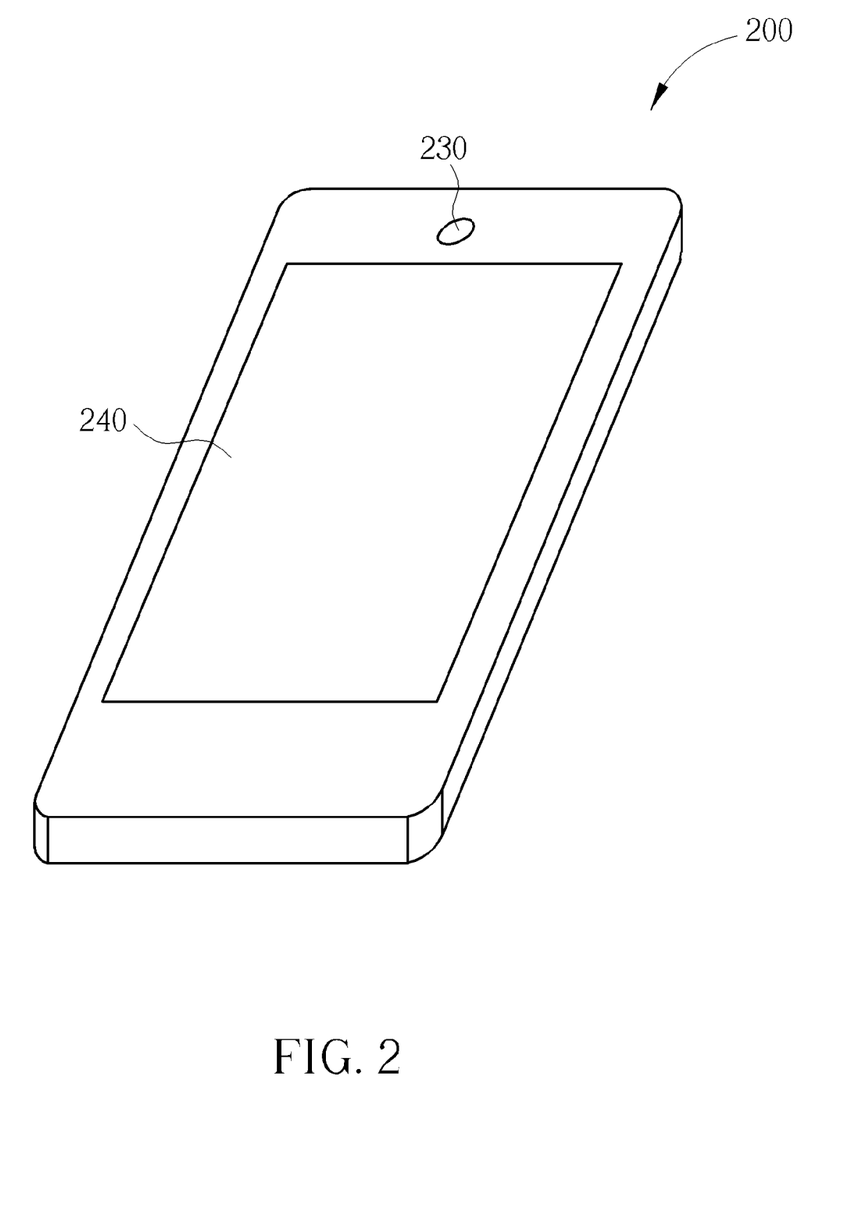
FIG. 2 illustrates some implementation details of the apparatus shown in FIG. 1 according to an example, where the apparatus of this example is a mobile phone.

FIG. 2 illustrates some implementation details of the apparatus 100 shown in FIG. 1 according to an example, where the apparatus of this example is a mobile phone equipped with a camera module 230 and a touch-sensitive display panel 240. For example, the touch-sensitive display panel 240 may comprise a liquid crystal display (LCD) module, and may comprise a transparent touch-control panel integrated into the LCD module. This is for illustrative purposes only, and is not meant to be a limitation.

Figure 3:
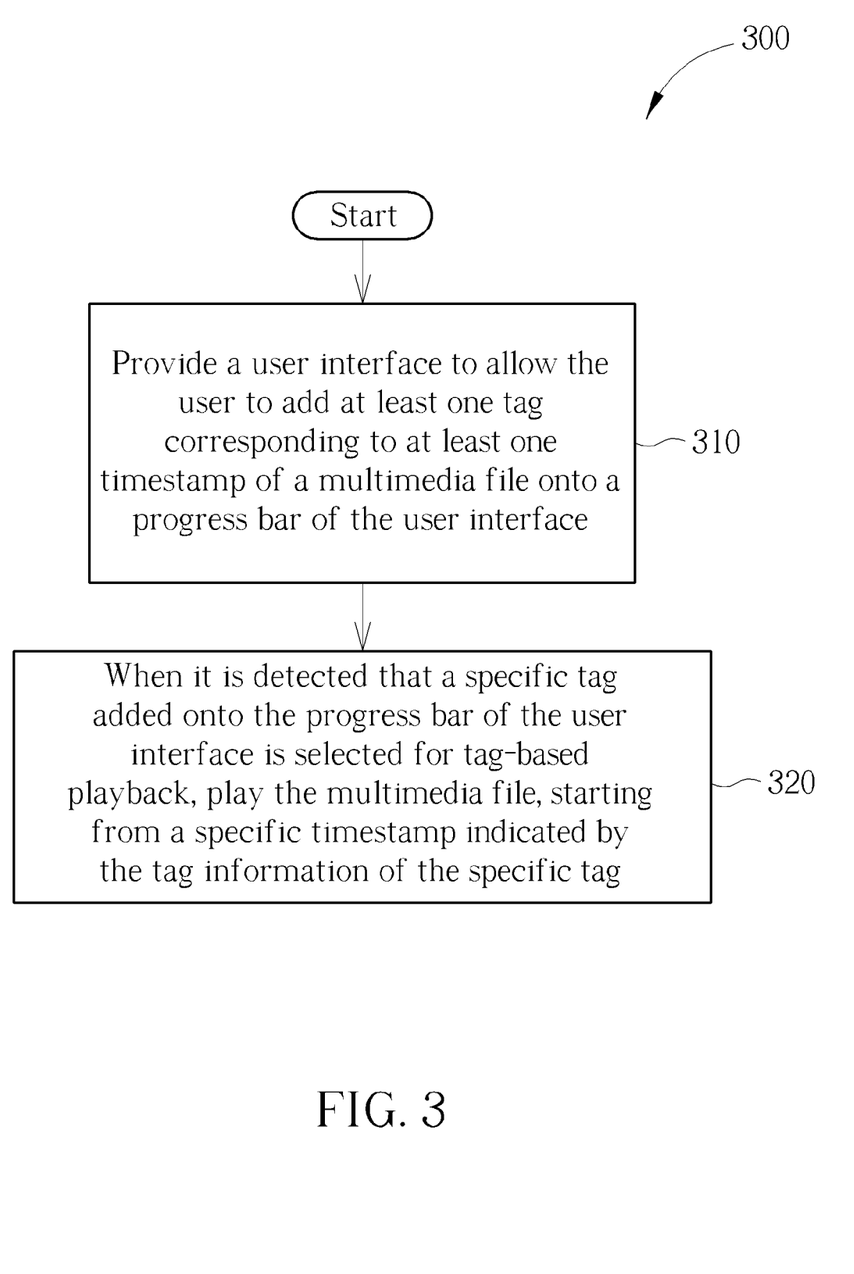
FIG. 3 illustrates a flowchart of a method for performing multimedia management utilizing tags according to an example.

FIG. 3 illustrates a flowchart of a method 300 for performing multimedia management utilizing tags according to an example. The method shown in FIG. 3 can be applied to the apparatus 100 shown in FIG. 1 (more particularly, the mobile phone 200 of the example shown in FIG. 2), and can be applied to the processing circuit 110 thereof (more particularly, the processing circuit 110 executing the program code 112 such as the application, the operating system or the driver mentioned above). For example, the program code 112 may be provided through a computer program product having program instructions for instructing a processor such as that mentioned above to perform the method 300 shown in FIG. 3, where the computer program product may be implemented as a non-transitory computer-readable medium (e.g. a floppy disk or a compact disc-read only memory (CD-ROM)) storing the program instructions or an equivalent version thereof, such as a software package for being installed. The method is described as follows.

In Step 310, the processing circuit 110 provides a user interface to allow the user to add at least one tag (e.g. one or more tags) corresponding to at least one timestamp (e.g. one or more timestamps) of a multimedia file such as that mentioned above onto a progress bar of the user interface. More particularly, the user interface can be a user interface of a multimedia player running on the electronic device, where the multimedia player can be taken as an example of the application mentioned above. According to this example, in a situation where the multimedia file has been loaded by the multimedia player, when the progress bar is displayed, the aforementioned at least one tag is displayed. This is for illustrative purposes only, and is not meant to be a limitation of the present invention. In another example, during playback of the multimedia file, when the progress bar is displayed, the aforementioned at least one tag is displayed.

In some examples, the processing circuit 110 may display (e.g. by utilizing the touch-sensitive display panel 240 shown in FIG. 2) the aforementioned at least one tag on or adjacent to the progress bar, where at least one relative location of the aforementioned at least one tag with respect to the beginning of the progress bar corresponds to the time indicated by the aforementioned at least one timestamp. For example, in a situation where the aforementioned at least one tag comprises a plurality of tags, the processing circuit 110 may display (e.g. by utilizing the touch-sensitive display panel 240 shown in FIG. 2) the plurality of tags on or adjacent to the progress bar, where the relative locations of the plurality of tags with respect to the beginning of the progress bar correspond to the time indicated by the timestamps indicated by the tag information of the plurality of tags, respectively. That is, the location of each tag of these tags represents the time of the corresponding timestamp (which is stored as a portion of the tag information of the tag under consideration), and therefore, when these tags are displayed on or adjacent to the progress bar, the user may easily realize the corresponding time of these tags, respectively.

In Step 320, when it is detected that a specific tag added onto the progress bar of the user interface is selected for tag-based playback, the processing circuit 110 plays the multimedia file, starting from a specific timestamp indicated by the tag information of the specific tag. For example, during playback of the multimedia file, when it is detected that a tag virtual button of the user interface is touched, the processing circuit 110 may display (e.g. by utilizing the touch-sensitive display panel 240 shown in FIG. 2) at least one digest image corresponding to the aforementioned at least one timestamp on the aforementioned at least one tag to indicate partial video contents of the multimedia file at the aforementioned at least one timestamp. When it is detected that a specific digest image displayed on the specific tag is touched, the processing circuit 110 plays the multimedia file, starting from the specific timestamp indicated by the tag information of the specific tag.

According to some examples, in a situation where the plurality of tags mentioned above comprises the specific tag, the plurality of tags comprising the specific tag may have been added onto the progress bar of the user interface in advance. For example, during playback of the multimedia file, when a rightward user gesture is detected, the processing circuit 110 plays the multimedia file, starting from the next timestamp indicated by the tag information of the next tag of the specific tag, where the next tag is typically displayed at the right side of the specific tag. In another example, during playback of the multimedia file, when a leftward user gesture is detected, the processing circuit 110 plays the multimedia file, starting from the previous timestamp indicated by the tag information of the previous tag of the specific tag, where the previous tag is typically displayed at the left side of the specific tag. This is for illustrative purposes only, and is not meant to be a limitation of the present invention. According to some examples, the operations of Step 320 may be performed based on the rightward user gesture or the leftward user gesture mentioned above. For example, during playback of the multimedia file, when the rightward user gesture is detected and the current time indicator on the progress bar is at the left side of the specific tag, the processing circuit 110 plays the multimedia file, starting from the specific timestamp indicated by the tag information of the specific tag. In another example, during playback of the multimedia file, when the leftward user gesture is detected and the current time indicator on the progress bar is at the right side of the specific tag, the processing circuit 110 plays the multimedia file, starting from the specific timestamp indicated by the tag information of the specific tag.

According to some variations of the example shown in FIG. 3, the processing circuit 110 may attach the tag information of the aforementioned at least one tag to the multimedia file, where the tag information of the aforementioned at least one tag may comprise the aforementioned at least one timestamp. More particularly, the tag information of the aforementioned at least one tag may further comprise at least one tag text of the aforementioned at least one tag, and the user interface allows the user to input or edit the aforementioned at least one tag text for the aforementioned at least one tag. In practice, the aforementioned at least one tag text can be at least one string for indicating the heading for the video content corresponding to the aforementioned at least one tag.

Figure 4:
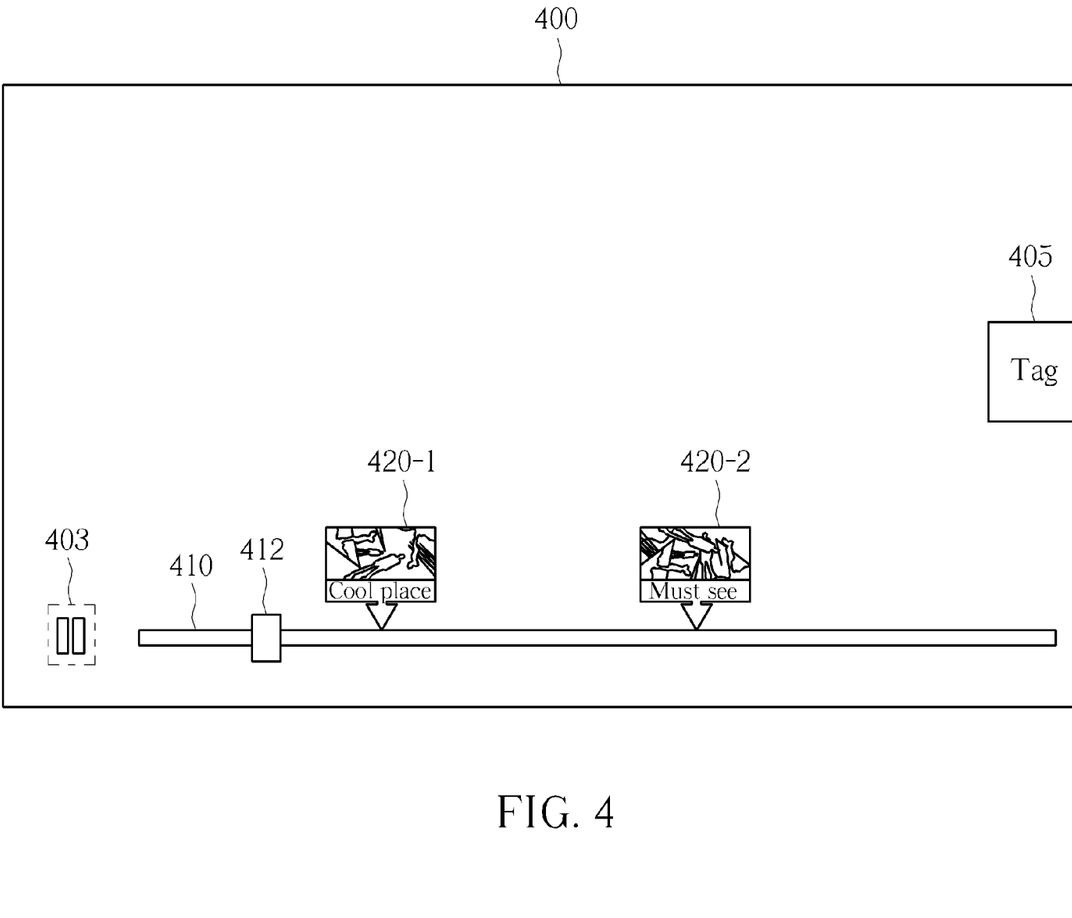
FIG. 4 illustrates a tag-based control scheme involved with the method shown in FIG. 3 according to an example.

FIG. 4 illustrates a tag-based control scheme involved with the method 300 shown in FIG. 3 according to an example. In this example, the aforementioned multimedia player may perform operations utilizing tags such as that mentioned above. More particularly, the multimedia player can be a video player having the video player user interface (UI) 400, where the video player user interface 400 can be taken as an example of the user interface mentioned in Step 310. As shown in FIG. 4, the video player user interface 400 in this example may comprise some virtual buttons for the user to control operations of the video player. For example, these virtual buttons may comprise at least one play/pause virtual button 403 (more particularly, a pause virtual button in FIG. 4, for example), and may comprise a tag virtual button 405 for triggering some related settings of tag-based control, where the tag virtual button 405 can be taken as an example of the tag virtual button mentioned in the example shown in FIG. 3. In addition, the video player user interface 400 may comprise a progress bar 410, which can be taken as an example of the progress bar mentioned in Step 310, and may further comprise one or more tags such as the tags 420-1 and 420-2, which can be added onto the progress bar 410 in advance as disclosed in some of the examples described above. For example, the user may input or edit the tag texts of the tags 420-1 and 420-2, respectively, where the tag texts of the tags 420-1 and 420-2 of this example can be the strings "Cool place" and "Must see", respectively. This is for illustrative purposes only, and is not meant to be a limitation. Additionally, the current time indicator 412 on the progress bar 410 can be taken as an example of the current time indicator mentioned above. In this example, the current time indicator 412 is illustrated with a rectangle overlaid on the progress bar 410, at the left side of the tag 420-1. This is for illustrative purposes only, and is not meant to be a limitation. In another example, the shape and color(s) of the current time indicator 412 can be changed. In some examples, the location of the current time indicator 412 may vary with respect to time during playback, and may vary based upon user control (e.g. the user may want to change the current time for playback by dragging the current time indicator 412).

Figure 5:
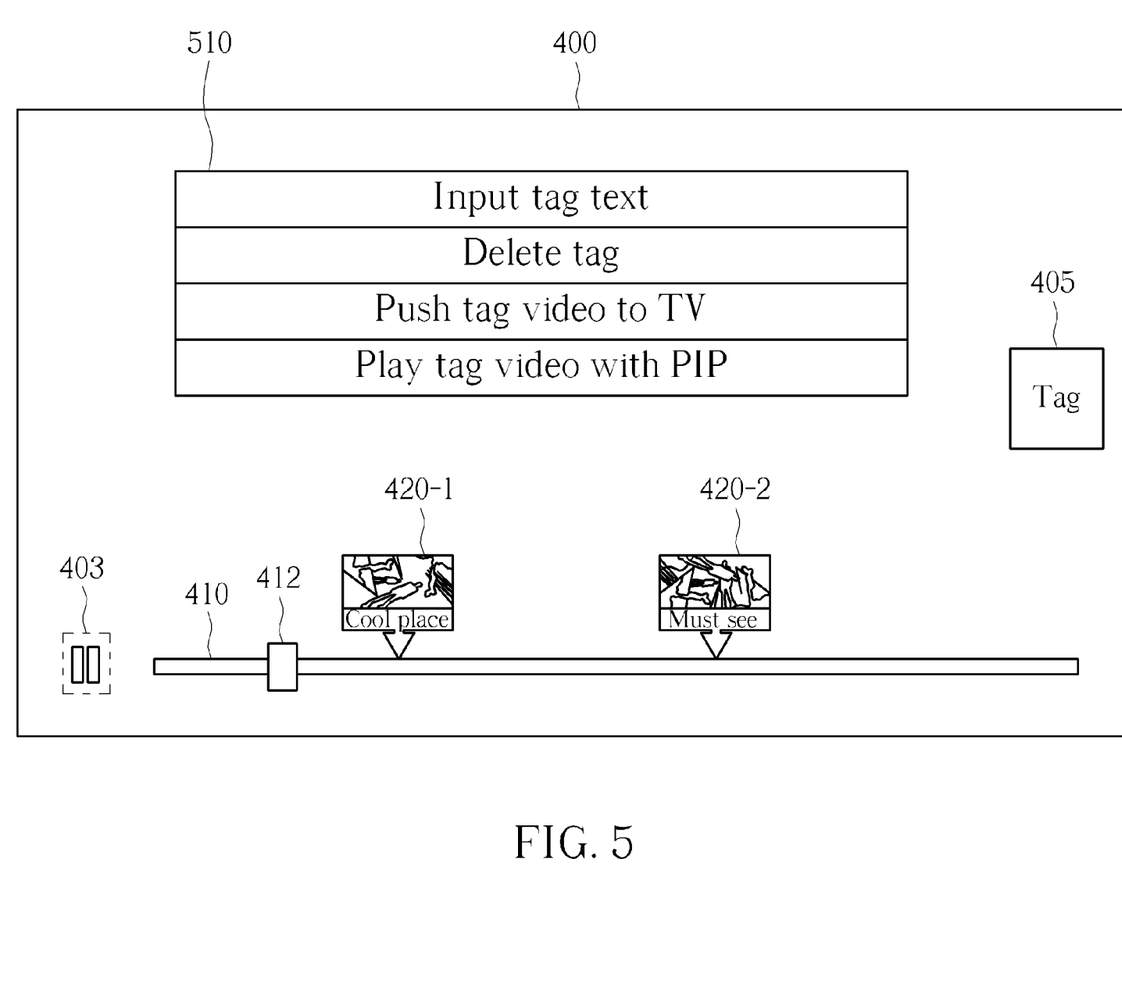
FIG. 5 illustrates a pop up menu regarding the tag-based control scheme shown in FIG. 4 according to an example.

FIG. 5 illustrates a pop up menu 510 regarding the tag-based control scheme shown in FIG. 4 according to an example. The pop up menu 510 may comprise a plurality of entries respectively indicating a plurality of options, such as the entries "Input tag text", "Delete tag", "Push tag video to TV", and "Play tag video with PIP" shown in FIG. 5, where the entries "Input tag text", "Delete tag", "Push tag video to TV", and "Play tag video with PIP" are arranged to provide a tag text inputting service (e.g. inputting or editing a tag text of a tag), a tag deleting service (e.g. deleting a tag), a tag video pushing service (e.g. pushing tag video to one or more external devices, for playing the multimedia file, starting from the specific timestamp indicated by the tag information of the specific tag), and a tag video picture in picture (PIP) service (e.g. playing the multimedia file with PIP function, starting from the specific timestamp indicated by the tag information of the specific tag), respectively.

According to this example, when it is detected that one of the plurality of tags mentioned above, such as the specific tag (e.g. any of the tags 420-1 and 420-2) is touched for a time period that reaches a predetermined touch time threshold, the processing circuit 110 may display (e.g. by utilizing the touch-sensitive display panel 240 shown in FIG. 2) the pop up menu 510 comprising the plurality of entries mentioned above. More particularly, an entry of the plurality of entries, such as the entry "Input tag text", can be utilized for inputting or editing the tag text of a tag, such as the tag text of the specific tag, and therefore, when needed, the user may input or edit the tag text of any of the tags 420-1 and 420-2 added onto the progress bar 410. In addition, another entry of the plurality of entries, such as the entry "Delete tag", can be utilized for deleting a tag such as the specific tag, and therefore, when needed, the user may delete any of the tags 420-1 and 420-2 previously added onto the progress bar 410. Additionally, a specific entry of the plurality of entries, such as any of the entries "Push tag video to TV", and "Play tag video with PIP" shown in FIG. 5, can be utilized for triggering the tag-based playback. More particularly, when it is detected that the specific entry is selected, the processing circuit 110 plays the multimedia file, starting from the specific timestamp indicated by the tag information of the specific tag.

For example, in a situation where the specific entry represents the entry "Push tag video to TV" shown in FIG. 5, when it is detected that the specific entry is selected, the processing circuit 110 plays the multimedia file by copying the tag video contents corresponding to the specific tag from the multimedia file into a temporary file (which can be temporarily stored in the storage unit 105, for example) and by sending the location or identifier of the temporary file to an external display device (e.g. a digital television (TV)) positioned outside the electronic device, in order to push the tag video contents to the external display device, where the tag video contents comprise partial contents of the multimedia file, such as the partial contents starting from the specific timestamp. As a result, the multimedia file is played on the external display device (e.g. the digital TV), starting from the specific timestamp indicated by the tag information of the specific tag, where the temporary file may be deleted when the tag-based playback corresponding to the specific tag is completed or canceled. This is for illustrative purposes only, and is not meant to be a limitation. In another example, in a situation where the specific entry represents the entry "Play tag video with PIP" shown in FIG. 5, when it is detected that the specific entry is selected, the processing circuit 110 creates a new window in a PIP manner within the aforementioned user interface such as the video player user interface 400 and plays the multimedia file in the new window, starting from the specific timestamp indicated by the tag information of the specific tag.

Figure 6:
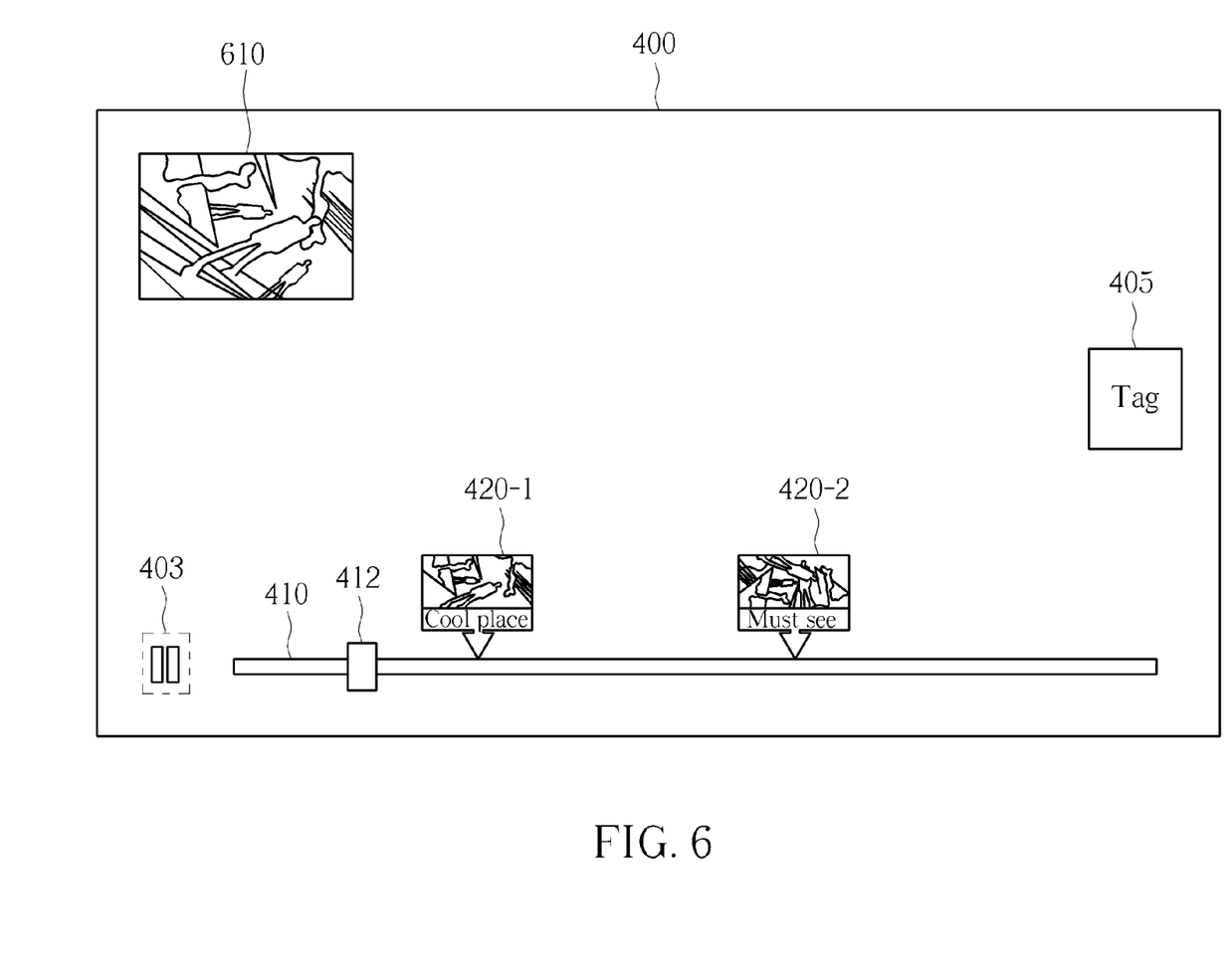
FIG. 6 illustrates picture in picture (PIP) playback regarding the tag-based control scheme shown in FIG. 4 according to an example.

FIG. 6 illustrates PIP playback regarding the tag-based control scheme shown in FIG. 4 according to an example. In this example, when it is detected that the entry "Play tag video with PIP" shown in FIG. 5 is selected, the processing circuit 110 creates the aforementioned new window in the PIP manner, such as the PIP window 610 shown in FIG. 6, within the video player user interface 400 and plays the multimedia file in the new window, starting from the specific timestamp indicated by the tag information of the specific tag. Please note that, under control of the processing circuit 110, the original playback progress in the main window of the video player user interface 400 shown in FIG. 4 may continue without being hindered by the tag-based playback in the PIP window 610 shown in FIG. 6.

Figure 7:
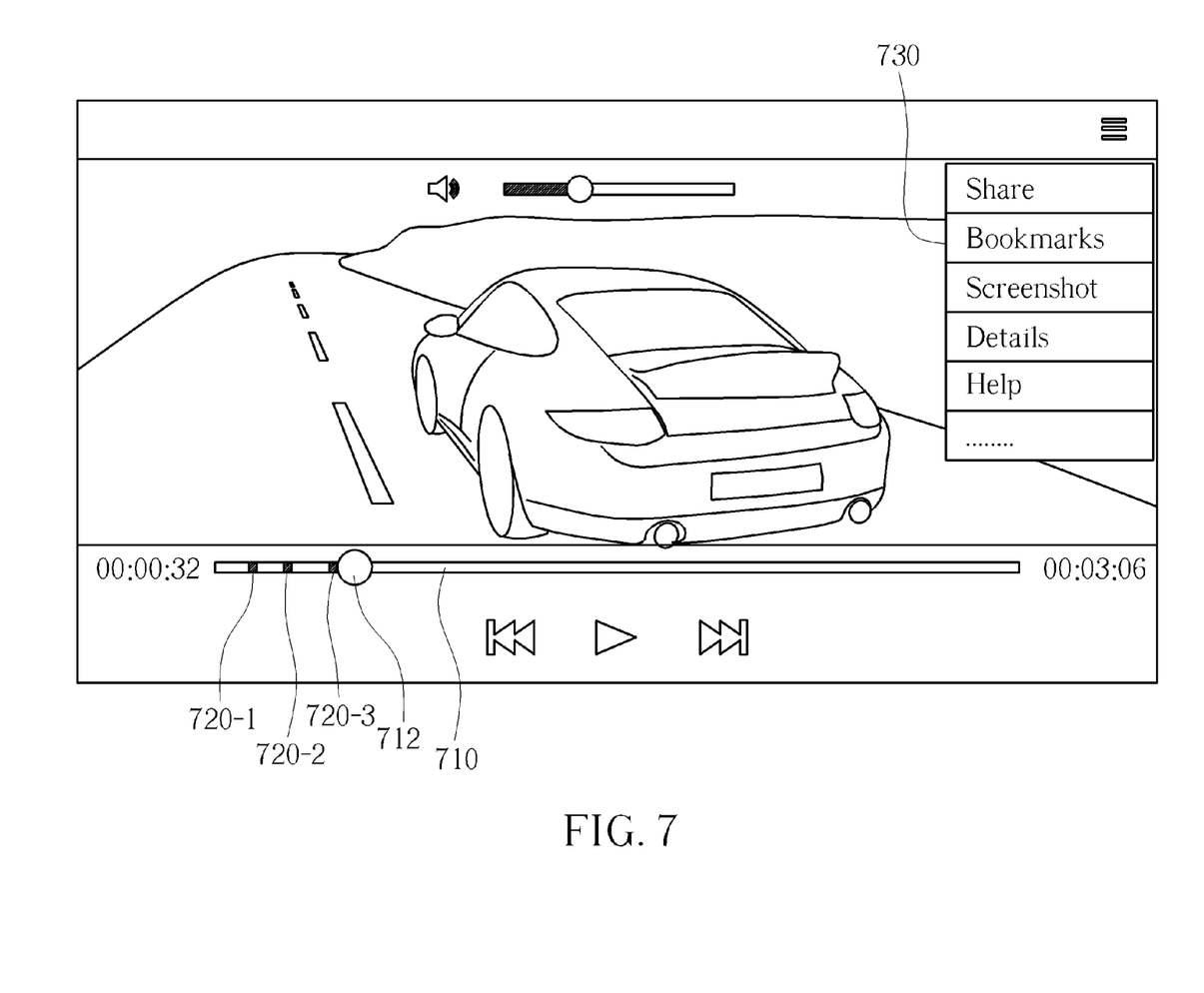
FIG. 7 illustrates a tag-based control scheme involved with the method shown in FIG. 3 according to another example.

FIG. 7 illustrates a tag-based control scheme involved with the method 300 shown in FIG. 3 according to another example. The progress bar 710 can be taken as an example of the progress bar mentioned in Step 310, and the tags 720-1, 720-2, and 720-3 can be added onto the progress bar 710 in advance as disclosed in some of the examples described above. For example, the user may input or edit the tag texts of the tags 720-1, 720-2, and 720-3, respectively, where the tag texts of the tags 720-1, 720-2, and 720-3 of this example can be temporarily hidden, respectively. This is for illustrative purposes only, and is not meant to be a limitation. In another example, the user may omit inputting the tag texts of the tags 720-1, 720-2, and 720-3, respectively. In some examples, the function of inputting the tag texts of the tags 720-1, 720-2, and 720-3 may be disabled or canceled. In addition, the current time indicator 712 on the progress bar 710 can be taken as an example of the current time indicator mentioned above, where the current time "00:00:32" shown in the lower left of FIG. 7 is the time of the current time indicator 712, and the other time "00:03:06" shown in the lower right of FIG. 7 is the total length of time of the multimedia file. In this example, the current time indicator 712 is illustrated with a circle overlaid on the progress bar 710, at the right side of the tag 720-3. This is for illustrative purposes only, and is not meant to be a limitation. In another example, the shape and color(s) of the current time indicator 712 can be changed. In some examples, the location of the current time indicator 712 may vary with respect to time during playback, and may vary based upon user control (e.g. the user may want to change the current time for playback by dragging the current time indicator 712).

As shown in FIG. 7, the user interface of this example may comprise a pop up menu 730, which can be triggered based on a certain user gesture or a certain virtual button in the user interface. For example, the pop up menu 730 may comprise a plurality of entries respectively indicating a plurality of options, such as the entries "Share", "Bookmarks", "Screenshot", "Details", and "Help" shown in FIG. 7, where the entries "Share", "Bookmarks", "Screenshot", "Details", and "Help" are arranged to provide a sharing service (e.g. sharing the multimedia file), a bookmark related service (e.g. adding or utilizing bookmarks), a screenshot service (e.g. obtain a screenshot), detail information of the video player of this example, and help information (e.g. the method of using this video player), respectively. More particularly, when it is detected that the entry "Share" is selected, the processing circuit 110 may attach the aforementioned tag information (e.g. the timestamps associated to the tags and the tag texts (or tag strings) of the tags) to the multimedia file, for purpose of sharing the multimedia file together with the aforementioned tag information. As a result, the user may share the multimedia file with his/her friend, and they may view the multimedia file with aid of the tags, starting from the timestamp indicated by the tag information of any of the tags (e.g. the specific tag). This is for illustrative purposes only, and is not meant to be a limitation. In another example, when it is detected that the entry "Share" is selected, the processing circuit 110 may prepare a copy of the multimedia file and attach the aforementioned tag information (e.g. the timestamps associated to the tags and the tag texts (or tag strings) of the tags) to the copy of the multimedia file, for purpose of sharing the multimedia file together with the aforementioned tag information, where the multimedia file will not be altered within the electronic device mentioned above. As a result, the user may share the multimedia file with his/her friend, and they may view the multimedia file with aid of the tags, starting from the timestamp indicated by the tag information of any of the tags (e.g. the specific tag). Similar descriptions for this example are not repeated in detail here.

Figure 8:
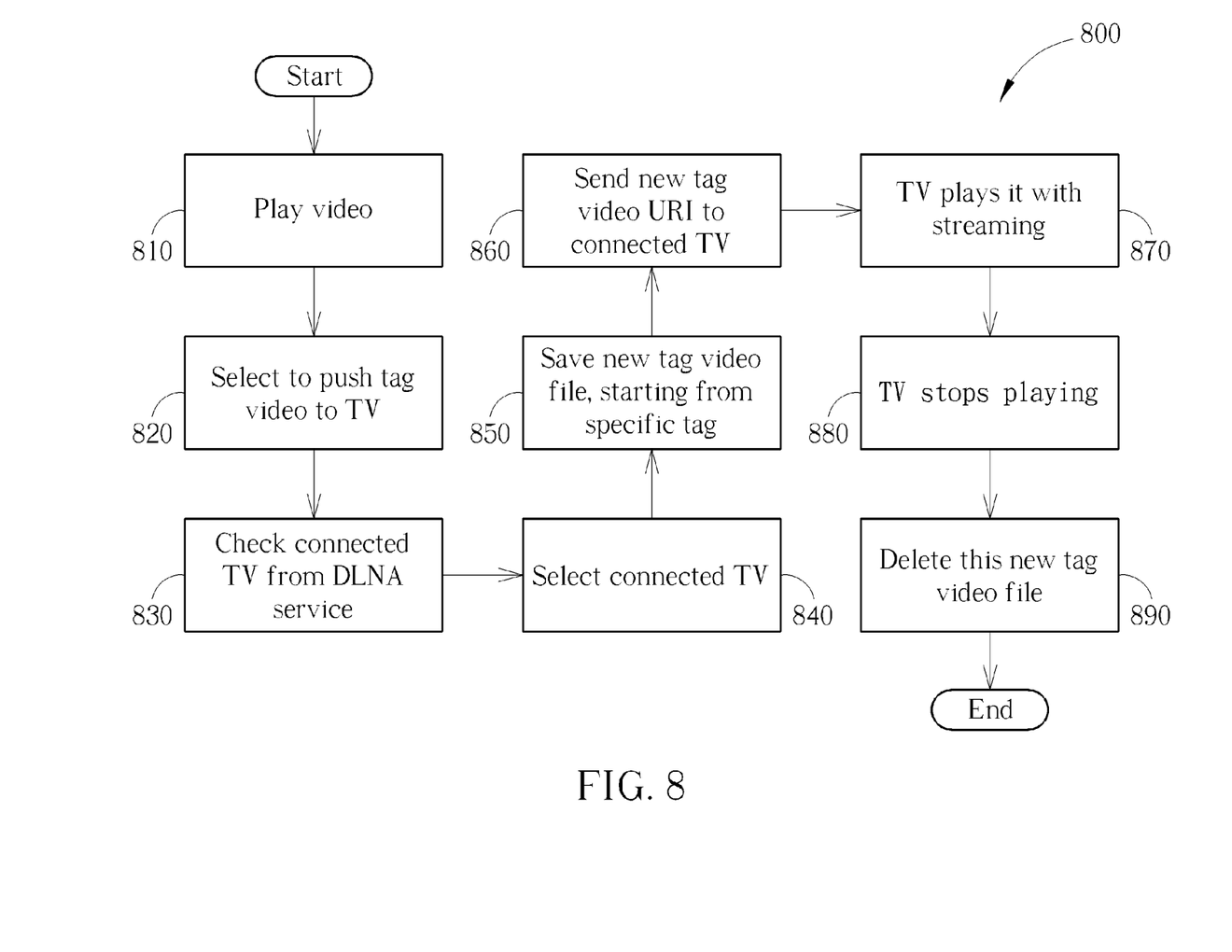
FIG. 8 illustrates a working flow involved with the method shown in FIG. 3 according to an example.

FIG. 8 illustrates a working flow 800 involved with the method 300 shown in FIG. 3 according to an example.

In Step 810, the processing circuit 110 plays the multimedia file such as the video clip mentioned in the example shown in FIG. 1 (labeled "Play video" in FIG. 8, for brevity).

In Step 820, in response to the user's instruction (e.g. the user touches the entry "Push tag video to TV" in the pop up menu 510 shown in FIG. 5), the processing circuit 110 selects to provide the aforementioned tag video pushing service (labeled "Select to push tag video to TV" in FIG. 8, for brevity). For example, the tag video pushing service may correspond to the specific tag mentioned above (e.g. one of the tags 420-1 and 420-2 shown in FIG. 4, or one of the tags 720-1, 720-2, and 720-3 shown in FIG. 7). This is for illustrative purposes only, and is not meant to be a limitation.

In Step 830, the processing circuit 110 checks one or more connected TVs from the Digital Living Network Alliance (DLNA) service. For example, in a situation where only one connected TV is available in the DLNA service, the processing circuit 110 may check the connected TV from the DLNA service. This is for illustrative purposes only, and is not meant to be a limitation. In a situation where multiple connected TVs are available, the processing circuit 110 may determine which of the connected TVs available in the DLNA service is suitable for use in the operations of the following steps.

In Step 840, the processing circuit 110 selects a connected TV (e.g. one of the connected TVs mentioned in Step 830), where the connected TV can be taken as an example of the external display device mentioned above.

In Step 850, the processing circuit 110 saves a new tag video file, starting from the specific tag (more particularly, starting from the specific timestamp indicated by the tag information of the specific tag), where the new tag video file can be taken as an example of the temporary file mentioned above.

In Step 860, the processing circuit 110 sends the uniform resource identifier (URI) of the new tag video file (labeled "new tag video URI" in FIG. 8, for brevity) to the connected TV. As a result, the connected TV may access the new tag video file.

In Step 870, the connected TV plays the new tag video file with aid of DLNA streaming (labeled "TV plays it with streaming" in FIG. 8, for brevity), where the processing circuit 110 may send DLNA streaming contents to the connected TV for the tag-based playback on the connected TV.

In Step 880, the connected TV stops playing the new tag video file (labeled "TV stops playing" in FIG. 8, for brevity). For example, the tag-based playback on the connected TV may be completed. In another example, the tag-based playback on the connected TV may be canceled.

In Step 890, the processing circuit 110 deletes this new tag video file. This is for illustrative purposes only, and is not meant to be a limitation. In some examples, it is unnecessary to delete the aforementioned temporary file such as this new tag video file, where the temporary file may be kept for further use.

As a result of applying the working flow 800, the user may easily share the multimedia file, where the related art problems can be prevented. Similar descriptions for this example are not repeated in detail here.

Figure 9:
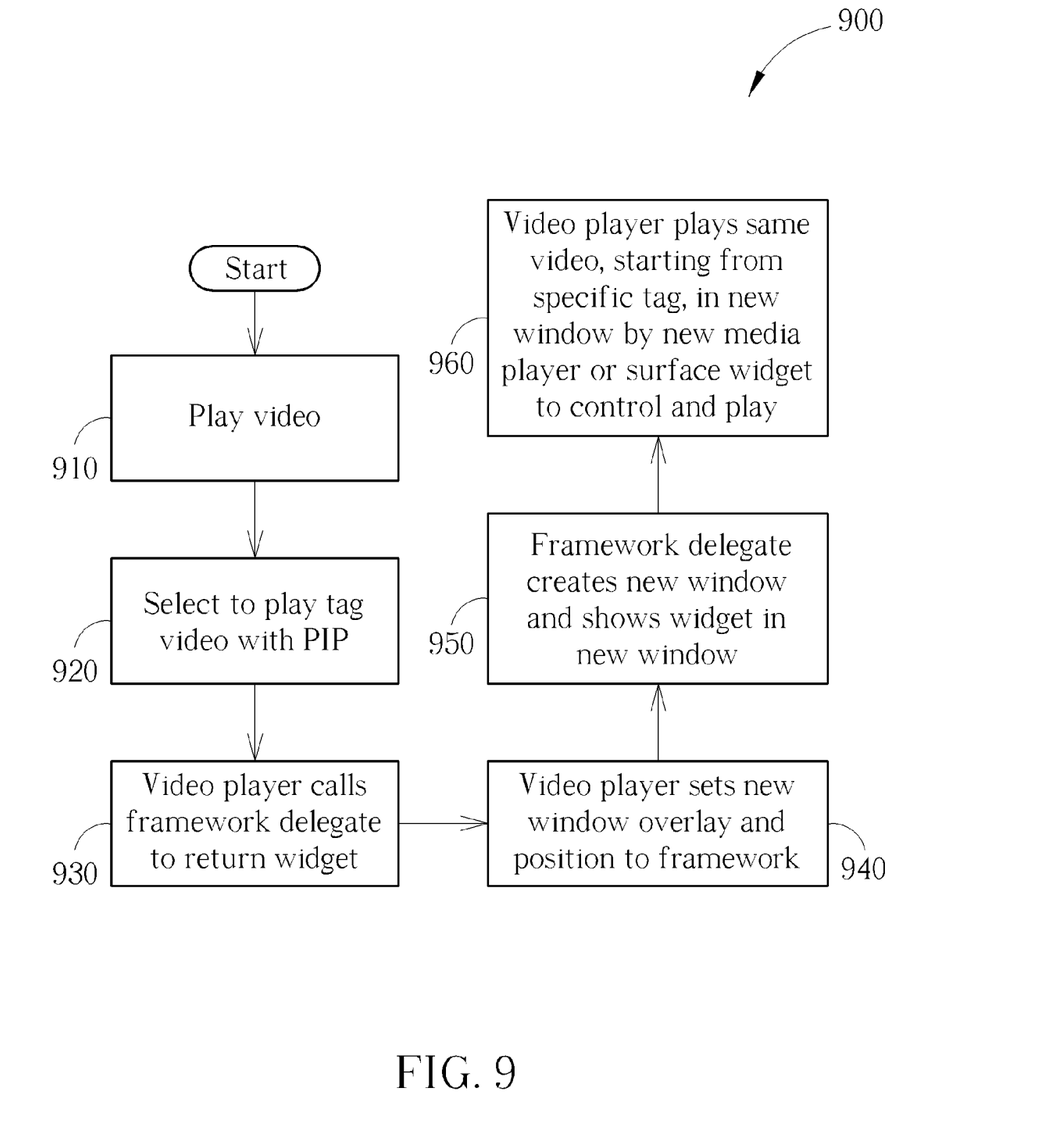
FIG. 9 illustrates a working flow involved with the method shown in FIG. 3 according to another example.

FIG. 9 illustrates a working flow 900 involved with the method 300 shown in FIG. 3 according to another example.

In Step 910, the processing circuit 110 plays the multimedia file such as the video clip mentioned in the example shown in FIG. 1 (labeled "Play video" in FIG. 9, for brevity).

In Step 920, in response to the user's instruction (e.g. the user touches the entry "Play tag video with PIP" in the pop up menu 510 shown in FIG. 5), the processing circuit 110 selects to provide the aforementioned tag video PIP service (labeled "Select to play tag video with PIP" in FIG. 9, for brevity). For example, the tag video PIP service may correspond to the specific tag mentioned above (e.g. one of the tags 420-1 and 420-2 shown in FIG. 4, or one of the tags 720-1, 720-2, and 720-3 shown in FIG. 7). This is for illustrative purposes only, and is not meant to be a limitation.

In Step 930, the aforementioned video player (which can be taken as an example of the multimedia player running on the processing circuit 110) calls the framework delegate to return a widget, where at least one command may be utilized (e.g., Widget*gaia::core::MultiWindow::onWindowCreate). This is for illustrative purposes only, and is not meant to be a limitation.

In Step 940, the video player sets new window overlay and position to the framework.

In Step 950, the framework delegate creates a new window such as that mentioned above (e.g. the PIP window 610 shown in FIG. 6) and shows the widget in the new window.

In Step 960, the video player plays the same video, starting from specific tag, in the new window by the new media player or surface widget to control and play.

As a result of applying the working flow 900, the user may easily share the multimedia file, where the related art problems can be prevented. Similar descriptions for this example are not repeated in detail here.

According to an aspect, the aforementioned computer program product can be composed of several code segments. In addition, after these code segments are loaded into the apparatus 100 (more particularly, the processing circuit 110) and are executed, the steps and features of the method shown in FIG. 4 can be implemented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing multimedia management utilizing tags, the method being applied to an electronic device, the method comprising the steps of:
providing a user interface for adding at least one tag corresponding to at least one timestamp of a multimedia file onto a progress bar of the user interface, wherein the user interface is a user interface of a multimedia player running on the electronic device;

detecting a specific tag added onto the progress bar of the user interface being selected for tag-based playback, and playing the multimedia file, starting from a specific timestamp indicated by tag information of the specific tag; and during playback of the multimedia file, detecting a tag virtual button of the user interface being touched, and displaying at least one digest image corresponding to the at least one timestamp on the at least one tag, wherein the digest image is partial video contents of the multimedia file at the at least one timestamp.

2. The method of claim 1, further comprising:
displaying the at least one tag on or adjacent to the progress bar, wherein at least one relative location of the at least one tag with respect to beginning of the progress bar corresponds to time indicated by the at least one timestamp.

3. The method of claim 1, wherein in a situation where the multimedia file has been loaded by the multimedia player, when the progress bar is displayed, the at least one tag is displayed.

4. The method of claim 1, wherein during playback of the multimedia file, when the progress bar is displayed, the at least one tag is displayed.

5. The method of claim 1, wherein the step of playing the multimedia file starting from the specific timestamp indicated by the tag information of the specific tag further comprises:
detecting a specific digest image displayed on the specific tag being touched, and playing the multimedia file, starting from the specific timestamp indicated by the tag information of the specific tag.

6. The method of claim 1, wherein a plurality of tags comprising the specific tag is added onto the progress bar of the user interface; and the method further comprises:
during playback of the multimedia file, detecting a rightward user gesture, and playing the multimedia file, starting from a next timestamp indicated by tag information of a next tag of the specific tag; or
during playback of the multimedia file, detecting a leftward user gesture, and playing the multimedia file, starting from a previous timestamp indicated by tag information of a previous tag of the specific tag.

7. The method of claim 1, wherein a plurality of tags comprising the specific tag is added onto the progress bar of the user interface; and the step of playing the multimedia file starting from the specific timestamp indicated by the tag information of the specific tag further comprises:
during playback of the multimedia file, detecting a rightward user gesture and a current time indicator on the progress bar being at a left side of the specific tag, and playing the multimedia file, starting from the specific timestamp indicated by the tag information of the specific tag; or
during playback of the multimedia file, detecting a leftward user gesture and the current time indicator on the progress bar being at a right side of the specific tag, and playing the multimedia file, starting from the specific timestamp indicated by the tag information of the specific tag.

8. The method of claim 1, further comprising:
detecting the specific tag being touched for a time period that reaches a predetermined touch time threshold, and displaying a pop up menu comprising a plurality of entries, wherein a specific entry of the plurality of entries is utilized for triggering the tag-based playback.

9. The method of claim 8, wherein the step of playing the multimedia file starting from the specific timestamp indicated by the tag information of the specific tag further comprises:
detecting the specific entry being selected, and playing the multimedia file, starting from the specific timestamp indicated by the tag information of the specific tag.

10. The method of claim 9, wherein the step of playing the multimedia file starting from the specific timestamp indicated by the tag information of the specific tag further comprises:
detecting the specific entry being selected, and playing the multimedia file by copying tag video contents corresponding to the specific tag from the multimedia file into a temporary file and by sending a location of the temporary file to an external display device positioned outside the electronic device, in order to push the tag video contents to the external display device, wherein the tag video contents comprise partial contents of the multimedia file, the partial contents starting from the specific timestamp.

11. The method of claim 9, wherein the step of playing the multimedia file starting from the specific timestamp indicated by the tag information of the specific tag further comprises:
detecting the specific entry is selected, and creating a new window in a picture in picture (PIP) manner within the user interface and playing the multimedia file in the new window, starting from the specific timestamp indicated by the tag information of the specific tag.

12. The method of claim 1, further comprising:
detecting the specific tag being touched for a time period that reaches a predetermined touch time threshold, and displaying a pop up menu comprising a plurality of entries, wherein an entry of the plurality of entries is utilized for inputting or editing a tag text of the specific tag.

13. The method of claim 1, further comprising:
detecting the specific tag being touched for a time period that reaches a predetermined touch time threshold, and displaying a pop up menu comprising a plurality of entries, wherein an entry of the plurality of entries is utilized for deleting the specific tag.

14. The method of claim 1, further comprising:
attaching tag information of the at least one tag to the multimedia file, wherein the tag information of the at least one tag comprises the at least one timestamp.

15. The method of claim 14, wherein the tag information of the at least one tag further comprises at least one tag text of the at least one tag; and the user interface allows the user to input or edit the at least one tag text for the at least one tag.

16. An apparatus for performing multimedia management utilizing tags, the apparatus comprising at least one portion of an electronic device, the apparatus comprising:
a storage unit arranged to store information for the electronic device, wherein the storage unit comprises a tag database for storing tag information of tags; and
a processing circuit, coupled to the storage unit, arranged to control operations of the electronic device, and further arranged to provide a user interface for adding at least one tag corresponding to at least one timestamp of a multimedia file onto a progress bar of the user interface, wherein the processing circuit detects that a specific tag added onto the progress bar of the user interface is selected for tag-based playback, the processing circuit plays the multimedia file, starting from a specific timestamp indicated by tag information of the specific tag;

wherein a plurality of tags comprising the specific tag is added onto the progress bar of the user interface; and during playback of the multimedia file, when the processing circuit detects a rightward user gesture, the processing circuit plays the multimedia file, starting from a next timestamp indicated by tag information of a next tag of the specific tag; and when the processing circuit detects a leftward user gesture, the processing circuit plays the multimedia file, starting from a previous timestamp indicated by tag information of a previous tag of the specific tag when a leftward user gesture is detected.

17. An apparatus for performing multimedia management utilizing tags, the apparatus comprising at least one portion of an electronic device, the apparatus comprising:
 a storage unit arranged to store information for the electronic device, wherein the storage unit comprises a tag database for storing tag information of tags; and
 a processing circuit, coupled to the storage unit, arranged to control operations of the electronic device, and further arranged to provide a user interface for adding at least one tag corresponding to at least one timestamp of a multimedia file onto a progress bar of the user interface, wherein when the processing circuit detects that a specific tag added onto the progress bar of the user interface is selected for tag-based playback, the processing circuit plays the multimedia file, starting from a specific timestamp indicated by tag information of the specific tag;

wherein a plurality of tags comprising the specific tag is added onto the progress bar of the user interface; and during playback of the multimedia file, the processing circuit plays the multimedia file, starting from the specific timestamp indicated by the tag information of the specific tag when the processing circuit detects a rightward user gesture and a current time indicator on the progress bar is at a left side of the specific tag, or plays the multimedia file, starting from the specific timestamp indicated by the tag information of the specific tag when the processing circuit detects a leftward user gesture and the current time indicator on the progress bar is at a right side of the specific tag.

18. A computer program product, having program instructions for instructing a processor of an electronic device to perform a method comprising the steps of:
 providing a user interface for adding at least one tag corresponding to at least one timestamp of a multimedia file onto a progress bar of the user interface;
 detecting a specific tag added onto the progress bar of the user interface being selected for tag-based playback, and playing the multimedia file, starting from a specific timestamp indicated by tag information of the specific tag; and
 detecting whether the specific tag is touched for a time period that reaches a predetermined touch time threshold, and if the specific tag is touched for the time period that reaches the predetermined touch time threshold, displaying a pop up menu comprising a plurality of entries, wherein a specific entry of the plurality of entries is utilized for triggering the tag-based playback.

* * * * *